United States Patent [19]

Kume et al.

[11] Patent Number: 5,480,700
[45] Date of Patent: Jan. 2, 1996

[54] LABEL, AND LABEL SHEET AND INK THEREFOR

[75] Inventors: Katsuya Kume; Yozo Oishi; Mitsuo Kuramoto; Itsuroh Takenoshita, all of Osaka, Japan

[73] Assignee: Nitto Denko Corporation, Osaka, Japan

[21] Appl. No.: 260,265

[22] Filed: Jun. 14, 1994

[30] Foreign Application Priority Data

Jun. 16, 1993 [JP] Japan .................. 5-169509

[51] Int. Cl.⁶ ........................................ B32B 3/00
[52] U.S. Cl. ................... 428/195; 428/42; 428/187; 428/207; 428/343; 428/411.1; 428/500; 428/507; 283/81
[58] Field of Search .............. 283/81; 428/195, 428/206, 913, 411.1, 914, 42, 187, 207, 343, 500, 507

[56] References Cited

U.S. PATENT DOCUMENTS

| | | | |
|---|---|---|---|
| 5,037,447 | 8/1991 | Nishimoto et al. | 8/467 |
| 5,198,296 | 3/1993 | Suzuki et al. | 428/336 |
| 5,302,431 | 4/1994 | Schultz | 428/35.7 |
| 5,330,232 | 7/1994 | Smith | 283/81 |

Primary Examiner—Patrick J. Ryan
Assistant Examiner—William A. Krynski
Attorney, Agent, or Firm—Sughrue, Mion, Zinn, Macpeak & Seas

[57] ABSTRACT

A label, and a label sheet and an ink used for the label are disclosed. The label comprises a label sheet comprising an ink-receiving layer comprising a polyolefin having a viscosity average molecular weight of from 5,000 to 6,000,000 as a film-forming component, and heat-transferred patterns comprising an ink comprising a polyolefin having a viscosity average molecular weight of from 5,000 to 300,000 and a coloring agent, formed on the ink-receiving layer.

14 Claims, 1 Drawing Sheet

LABEL, AND LABEL SHEET AND INK THEREFOR

FIELD OF THE INVENTION

The present invention relates to a label having heat-transferred patterns excellent in a solvent resistance and suitable for forming an identification label, and also to a label sheet and an ink used for the label.

BACKGROUND OF THE INVENTION

Hitherto, an identification label comprising a metal face plate having stamped thereon patterns, or a heat-resistant plastic sheet or a metal plate having thereon patterns formed with a curable ink is known. However, when a production system is changed to a system of producing many kinds of products with a small amount each, it is difficult to provide each identification label according to circumstances and there is a problem that the production of identification labels cannot deal with the production system of the many kinds of products with small amount each.

On the other hand, labels are known, each prepared by forming heat transferred patterns comprising a wax-based ink on a label sheet having an ink-receiving layer comprising a mixture of a styrene-polyolefin copolymer and a thermoplastic resin having a melting point of at least 200° C. as described in JP-A-62-299391 (the term "JP-A" as used herein means an "unexamined published Japanese patent application") or a label sheet having an ink-receiving layer comprising a mixture of an epoxy resin or the like, hydrophobic silica, and a low density polyethylene wax as described in JP-A-63-176183.

However, the labels each having the ink-receiving layer described above have the problem that they are poor in a solvent resistance, whereby the patterns are vanished by a washing step with a solvent or a wiping step thereof to lose the function as the labels.

SUMMARY OF THE INVENTION

Accordingly, one object of the present invention is to provide a label capable of being issued by forming patterns by a heat transfer system according to circumstances, the heat-transferred patterns being excellent in a solvent resistance and the applied pattern being preserved well even by applying thereto solvent washing or a wiping treatment.

Another object of the present invention is to provide a sheet for the label.

Still another object of the present invention is to provide an ink for the label.

According to one embodiment of the present invention, there is provided a label comprising a label sheet comprising an ink-receiving layer comprising a polyolefin having a viscosity average molecular weight of from 5,000 to 6,000,000 as a film-forming component, and heat-transferred patterns comprising an ink comprising a polyolefin having a viscosity average molecular weight of from 5,000 to 300,000 and a coloring agent, formed on the ink-receiving layer.

According to another embodiment of the present invention, there is provided a label sheet comprising the ink-receiving layer described above.

According to still another embodiment of the present invention, there is provided the ink for the label described above.

DETAILED DESCRIPTION OF THE INVENTION

The present invention is described in detail below.

By combining the ink-receiving layer having the above-described structure and the ink having the above-described components, patterns can be applied by a commercially available heat transfer printer according to circumstances, and heat-transferred patterns excellent in the solvent resistance due to the integrated combination by good molten press-adhesion of the polyolefin in the ink-receiving layer and the polyolefin in the ink at heat transferring can be formed.

Figure 1:
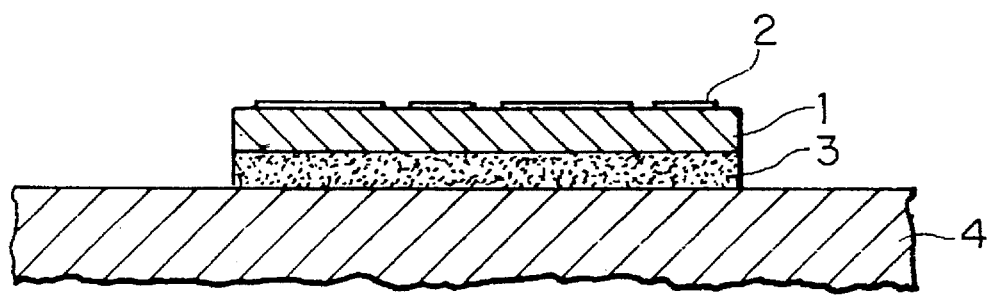
FIG. 1 is a cross sectional view of one example of the label of the present invention.

The label of the present invention comprises a label sheet having an ink-receiving layer comprising a polyolefin having a viscosity average molecular weight of from 5,000 to 6,000,000 as a film-forming component, and heat-transferred patterns comprising the ink comprising a polyolefin having a viscosity average molecular weight of from 5,000 to 300,000 and a coloring agent, formed on the ink-receiving layer. One example of the label of the present invention is shown in FIG. 1 of the accompanying drawing, wherein a pattern layer 2 is formed on a label sheet 1. In addition, a pressure-sensitive adhesive layer 3 is formed if necessary, and the label is adhered to an article 4 to be adhered.

The label sheet may be a sheet-like material having on the surface thereof an ink-receiving layer comprising a polyolefin having a viscosity average molecular weight of from 5,000 to 6,000,000 as a film-forming component and thus can be formed into a proper form. Examples of the sheet are a single layer form comprising the ink-receiving layer 1 itself as shown in FIG. 1, a composite form comprising the ink-receiving layer 11 and a reinforcing substrate 12 as shown in FIG. 2, and a form further having a pressure-sensitive adhesive layer 3 as shown in FIG. 1.

Figure 2:
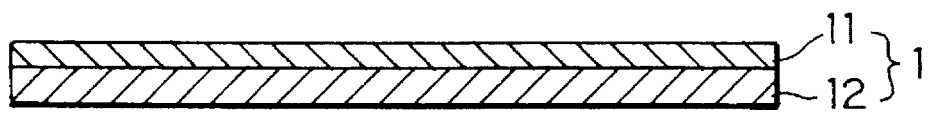
FIG. 2 is a cross sectional view of one example of the label sheet of the present invention.

The above-described composite form of the label sheet may be properly formed by a method of forming the ink-receiving layer on a sheet-like reinforcing substrate as shown in FIG. 2 by a heat laminating method, an extrusion coating method, etc., a method of impregnating a sheet-like reinforcing substrate with a solution-like or melt-like material for forming the ink-receiving layer, a method of inserting a sheet-like reinforcing substrate in the ink-receiving layer, a method of intermixing a reinforcing substrate of a fibrous form, etc., in the ink-receiving layer.

Accordingly, a proper substrate such as a resin-coated layer, a film, fibers, a cloth, a paper, a nonwoven fabric, a metal foil, a net, a wire, etc., may be used as the reinforcing substrate. The properties such as the heat resistance, etc., of the reinforcing substrate may be properly determined according to the purpose of use of the label. Further, a reinforcing substrate comprising a heat-resistant polymer such as polyester, polyimide, a fluorine resin, polyamide, etc., can also be used. In addition, by suitably selecting the reinforcing substrate, the label sheet or the label which is flexible and has a good adhesion to a curved surface can be easily formed.

The ink-receiving layer comprises a polyolefin having a viscosity average molecular weight of from 5,000 to 6,000,000, preferably 4,000,000 or less, and more preferably from 8,000 to 1,500,000, as the film-forming component. To obtain the ink-receiving layer having the composite form as described above, a reinforcing substrate such as a fibrous substrate, etc., can be intermixed. Furthermore, the ink-receiving layer may be a single layer comprising the polyolefin described above.

By employing the ink-receiving layer described above, the solvent resistance can be maintained. In addition, a counterplan for, if necessary, improving the contrast of the ink-receiving layer with the patterns formed may be applied to a reinforcing substrate used for the ink-receiving layer by using an opaque reinforcing substrate.

Polyethylene, polypropylene, etc., are generally used as the polyolefin for forming the ink-receiving layer described above. In this case, if the viscosity average molecular weight of the polyolefin is less than 5,000, the ink-receiving layer formed is poor in the solvent resistance, while if the viscosity average molecular weight is over 6,000,000, the ink-receiving layer formed is poor in the heat-melting property and patterns formed thereon by a heat transfer system are liable to fall off by rubbing, etc.

The thickness of the ink-receiving layer is from 1 to 100 µm, and preferably from 15 to 50 µm. If the thickness is less than 1 µm, the ink-receiving layer is, as the case may be, poor in the strength and if the thickness is over 100 µm, the patterns formed are liable to flow and deform by heat melting.

The label of the present invention can be formed by forming heat-transferred patterns comprising the ink comprising a polyolefin having a viscosity average molecular weight of from 5,000 to 300,000 and a coloring agent, on the ink-receiving layer of the label sheet.

The ink of the present invention can be prepared as a fluid material such as a paste-like material, etc., by heat-mixing at least one coloring agent and the polyolefin with a proper kneading machine such as a roll mill, etc., or by mixing them using, if necessary, a polyolefin-soluble solvent with a proper kneading machine such as a roll mill, a pot mill, etc.

Examples of the polyolefin for the ink which can be used are polyethylene, polypropylene, etc., each having a viscosity average molecular weight of from 5,000 to 300,000, preferably 200,000 or less, more preferably 100,000 or less, and most preferably from 7,000 to 50,000. If the viscosity average molecular weight of the polyolefin is less than 5,000, the ink is poor in the solvent resistance and if the viscosity average molecular weight is over 300,000, the melt viscosity of the ink is increased to make the patterning step difficult or fixing of transferred patterns of the ink by a commercially available heat transfer printer becomes difficult.

Examples of the coloring agent used for the ink are organic or inorganic pigments, carbon, metal powders, etc. Examples of the organic pigments are azo pigments, phthalocyanine pigments, triphenylmethane pigments, metal complex pigments, vat dye-based pigments, quinacridone pigments, and isoindolinone pigments.

Further, examples of the inorganic pigment are white pigments such as silica, titania, alumina, zinc white, zirconia, calcium oxide, mica, etc.; red pigments such as manganese oxide.alumina, chromium oxide.tin oxide, iron oxide, cadmium sulfide.selenium sulfide, etc.; blue pigments such as cobalt oxide, zirconia.vanadium oxide, chromium oxide.divanadium pentaoxide, etc.; black pigments such as chromium oxide.cobalt oxide.iron oxide.manganese oxide, chromates, permanganates, etc.; yellow pigments such as zirconium.silica.praseodymium, vanadium.tin, chromium.titanium.antimony, etc.; green pigments such as chromium oxide, cobalt.chromium, alumina.chromium, etc.; and pink pigments such as aluminum.manganese, iron.silica.zirconium, etc.

The proportions of the coloring agent used and the polyolefin for the ink used are properly determined according to the contrast with the label sheet, the heat-transfer press-fixing property, etc., but generally the coloring agent is used in an amount of from 50 to 500 parts by weight, and preferably from 100 to 300 parts by weight, per 100 parts by weight of the polyolefin.

An ink sheet such as a print ribbon, etc., which is necessary in the case of forming patterns by a heat transfer system can be prepared by applying the ink onto a support comprising a film, a cloth, etc., by a coating method, an impregnating method, etc. The support which can be used is usual supports, e.g., plastic films such as polyester films, polyimide films, fluorine resin films, etc., and cloths comprising fibers such as polyamide fibers, polyester fibers, etc.

To control the adhesion of the support for the ink layer, it is effective to employ a method of applying an under coating treatment with a wax, etc., onto the support.

The thickness of the ink layer on the ink sheet is generally from 0.2 to 5 µm, and preferably from 0.8 to 1.5 µm. If the thickness is less than 0.2 µm, the ink layer cannot sufficiently conceal a color of the ink-receiving layer, and if the thickness is over 5 µm, a good heat transfer by shearing the ink layer cannot be, as the case may be, performed, whereby food patterns cannot be formed.

The patterns formed are optional. That is, any desired patterns such as print patterns, design patterns, bar code patterns, etc., may be formed. In addition, in the case of forming the identification label, etc., it is preferred that a good contrast or the difference of a color tone is formed between the label sheet and the ink patterns.

If necessary, a pressure-sensitive adhesive layer for adhering the label to an article to be adhered can be formed onto the back surface of the label sheet or the label of the present invention. The pressure-sensitive adhesive layer can be formed at a proper stage until the label sheet, etc., is adhered to an article to be adhered. Thus, the pressure-sensitive adhesive layer can be previously formed before patterns are formed on the label sheet to form the label or can be formed after forming the label.

For forming the pressure-sensitive adhesive layer, an appropriate pressure-sensitive adhesive material can be used and generally, organic pressure-sensitive adhesives such as rubber pressure-sensitive adhesives, acrylic pressure-sensitive adhesives, silicone pressure-sensitive adhesives, vinyl alkyl ether pressure-sensitive adhesives, polyvinyl alcohol pressure-sensitive adhesives, polyvinyl pyrrolidone pressure-sensitive adhesives, polyacrylamide pressure-sensitive adhesives, cellulose pressure-sensitive adhesives, etc., are used.

The pressure-sensitive adhesive layer is formed on the label sheet or the label by a rolling method such as a calender roll method, etc., or an appropriate method of forming the pressure-sensitive adhesive layer on a separator by an appropriate sheet-forming method such as a doctor blade method, a gravure roll coating method, etc., and transferring the layer onto the label sheet or the label.

The thickness of the pressure-sensitive adhesive layer can be determined according to the purpose of use, but is generally from 1 to 500 μm. In addition, it is preferred that the pressure-sensitive adhesive layer formed is covered with a separator, etc., to prevent staining, etc., before adhering the layer onto the label sheet or the label.

The label sheet or the label of the present invention can be preferably used for various purposes such as the application of identification marks comprising bar codes, etc., or the application of other patterns onto various articles such as potteries, glass products, ceramic products, metal products, porcelain enamel products, resin products, wood products, etc. The label sheet or the label of the present invention can be particularly preferably used for articles to be adhered, which require a washing step with a solvent and a wiping step thereof. In addition, the article to be adhered with the label sheet or the label may have any optional form such as a tabular form, a container form, etc.

According to the present invention, optional patterns can be formed by a heat transfer method according to circumstances and necessary labels can be issued at any times. Further, the heat-transferred patterns in the present invention are excellent in the solvent resistance and are not vanished by solvent washing and the wiping treatment thereof, whereby the label of the present invention is excellent in the preservative property of the patterns formed thereon.

The present invention is described in more detail by the following examples, wherein all parts, unless otherwise indicated, are by weight.

EXAMPLE 1

An ink-receiving layer having a thickness of 50 μm and composed of a low-density polyethylene having a viscosity average molecular weight of about 300,000 was formed on one surface of an aluminum foil-having a thickness of 50 μm by heat laminating, and a pressure-sensitive adhesive layer having a thickness of 20 μm formed on a separator was press-adhered to other surface of the aluminum foil to obtain a label sheet.

The pressure-sensitive adhesive layer used above was formed by coating toluene solution of 100 parts of polybutyl acrylate having a viscosity average molecular weight of about 1,000,000 and 2 parts of a crosslinking agent on a separator composed of a glassine paper having a thickness of 70 μm treated with a silicone releasing agent by a doctor blade method followed by heat-drying.

On the other hand, 150 parts of a black powder having a mean particle size of 0.5 μm was added to 100 parts of polyethylene having a viscosity average molecular weight of about 8,000 followed by uniformly mixing at about 200° C., and the uniform dispersion thus obtained was coated on a polyester film having a thickness of 6 μm at a dry thickness of 0.8 μm by a hot-melt gravure coating machine to obtain an ink sheet. The black powder used above was composed of a powder of chromium oxide.iron oxide.cobalt oxide.manganese oxide.

Bar code patterns were formed on the ink-receiving layer of the label sheet prepared above using the ink sheet prepared above by means of a commercially available heat transfer printer to obtain a label.

EXAMPLE 2

A low-density polyethylene having a viscosity average molecular weight of about 8,000 was heat-melt extruded onto one surface of a copper foil having a thickness of 50 μm to form thereon an ink-receiving layer having a thickness of 20 μm, and the pressure-sensitive adhesive layer having a thickness of 20 μm was formed on other surface of the copper foil by the same manner as in Example 1 to obtain a label sheet.

On the other hand, 100 parts of a carbon powder was added to 100 parts of polyethylene having a viscosity average molecular weight of about 8,000 followed by uniformly mixing at about 200° C., and the uniform dispersion obtained was coated on a polyester film having a thickness of 4.5 μm by a hot-melt gravure coating machine at a dry thickness of 1.2 μm to obtain an ink sheet.

Bar code patterns were formed on the ink-receiving layer of the label prepared above using the ink sheet prepared above by means of a commercially available heat transfer printer to obtain a label.

Comparative Example 1

After forming the pressure-sensitive adhesive layer on one surface of a white polyester film having a thickness of 50 μm in the same manner as in Example 1, bar code patterns were formed on the other surface of the polyester film using a commercially available wax ink sheet according to the same manner as in Example 1 to obtain a label.

Comparative Example 2

After forming the pressure-sensitive adhesive layer on one surface of a polyester film having a thickness of 50 μm in the same manner as in Example 1, bar code patterns were formed on the other surface of the polyester film in the same manner as in Example 1 to obtain a label.

Evaluation Test:

A separator was released from each of the labels obtained in the Examples and the Comparative Examples, each label was press-adhered to a glass plate through the pressure-sensitive adhesive layer, and after wiping off the patterned surface with a nonwoven fabric impregnated with a solvent, the residual state of the patterns was determined. In addition, acetone, toluene, dimethylacetamide, or methylene chloride was used as the solvent.

The results obtained are shown in the Table below.

TABLE

| Solvent | Example 1 | Example 2 | Comparative Example 1 | Comparative Example 2 |
|---|---|---|---|---|
| Acetone | Unchanged | Unchanged | Vanished | Vanished |
| Toluene | Unchanged | Unchanged | Vanished | Vanished |
| Dimethyl-acetamide | Unchanged | Unchanged | Vanished | Vanished |
| Methylene Chloride | Unchanged | Unchanged | Vanished | Vanished |

While the invention has been described in detail and with reference to specific embodiments thereof, it will be apparent to one skilled in the art that various changes and modifications can be made therein without departing from the spirit and scope thereof.

What is claimed is:

1. A label consisting essentially of:

a label sheet comprising an ink-receiving layer comprising a polyolefin having a viscosity average molecular weight of from 5,000 to 6,000,000 as a film-forming component and heat-transferred patterns comprising an ink comprising a polyolefin having a viscosity average molecular weight of from 5,000 to 300,000 and a coloring agent, formed on the ink-receiving layer, wherein said ink-receiving layer has a thickness of from 1 to 100 μm.

2. A label as claimed in claim 1, wherein said label sheet consists of the ink-receiving layer.

3. A label as claimed in claim 1, wherein said label sheet comprises the ink-receiving layer and a reinforcing substrate.

4. A label as claimed in claim 1, wherein said polyolefin for the ink-receiving layer has a viscosity average molecular weight of from 5,000 to 4,000,000.

5. A label as claimed in claim 1, wherein said polyolefin for the ink has a viscosity average molecular weight of from 5,000 to 200,000.

6. A label as claimed in claim 1, wherein said coloring agent is selected from the group consisting of organic or inorganic pigments, carbon and metal powders.

7. A label as claimed in claim 1, wherein said coloring is used in an amount of from 50 to 500 parts by weight per 100 parts by weight of the polyolefin for the ink.

8. A label as claimed in claim 1, wherein said label further comprises a pressure-sensitive adhesive layer.

9. A label sheet comprising an ink-receiving layer comprising a polyolefin having a viscosity average molecular weight of from 5,000 to 6,000,000 as a film-forming component.

10. A label sheet as claimed in claim 9, wherein said label sheet consists of the ink-receiving layer.

11. A label sheet as claimed in claim 9, wherein said label sheet comprises the ink-receiving layer and a reinforcing substrate.

12. A label sheet as claimed in claim 9, wherein said polyolefin for the ink-receiving layer has a viscosity average molecular weight of from 5,000 to 4,000,000.

13. A label sheet as claimed in claim 9, wherein said ink-receiving layer has a thickness of from 1 to 100 μm.

14. A label sheet as claimed in claim 9, wherein said label sheet further comprises a pressure-sensitive adhesive layer.

* * * * *